(12) United States Patent
Kinoshita et al.

(10) Patent No.: US 8,329,110 B2
(45) Date of Patent: Dec. 11, 2012

(54) ELECTRICALLY-HEATED CATALYST

(75) Inventors: Yasuo Kinoshita, Aichi-gun (JP); Tatsuo Iida, Anjo (JP); Tadashi Takagaki, Toyota (JP); Hideji Naito, Tajimi (JP); Gozo Kaji, Toyota (JP); Kenji Shimoda, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/168,203

(22) Filed: Jun. 24, 2011

(65) Prior Publication Data

US 2012/0121476 A1    May 17, 2012

Related U.S. Application Data

(63) Continuation of application No. PCT/JP2010/070148, filed on Nov. 11, 2010.

(51) Int. Cl.
*B01D 50/00*    (2006.01)
(52) U.S. Cl. ...................................... 422/177
(58) Field of Classification Search .................. 422/177, 422/180
See application file for complete search history.

(56) References Cited

U.S. PATENT DOCUMENTS 5,569,455 A * 10/1996 Fukui et al. ................... 422/174

FOREIGN PATENT DOCUMENTS

| JP | 05-115795 A | 5/1993 |
| JP | 08-105317 A | 4/1996 |
| JP | 2003-264223 A | 9/2003 |
| JP | 2004-011592 A | 1/2004 |
| JP | 2005-136350 A | 5/2005 |
| JP | 2012-066188 A | 4/2012 |

OTHER PUBLICATIONS

International Search Report dated Jan. 11, 2011 of PCT/JP2010/070148 and Written Opinion.

* cited by examiner

*Primary Examiner* — Tom Duong
(74) *Attorney, Agent, or Firm* — Kenyon & Kenyon LLP

(57) ABSTRACT

An electrically-heated catalyst is disclosed. The catalyst may include a carrier; more than two comb-shaped electrode portions extending in a longitudinal direction; an electrically conductive underlying layer provided between the carrier and the comb-shaped electrode portions; and more than two electrically conductive fixing layers bonding to at least one of the comb-shaped electrode portions and to the underlying layer to fix the comb-shaped electrode portions to the carrier at more than two points spaced apart.

8 Claims, 6 Drawing Sheets

US 8,329,110 B2

ELECTRICALLY-HEATED CATALYST

CROSS-REFERENCE TO RELATED APPLICATIONS

The present application is a U.S. continuation application filed under 35 U.S.C. 111(a) and 356(c) of PCT application No. PCT/JP2010/070148, filed on Nov. 11, 2010, the entire contents of which are hereby incorporated by reference.

TECHNICAL FIELD

The present invention is related to a catalyst. In particular the present invention is related to an electrically-heated catalyst which is energized and heated for effectively cleaning exhaust gas from a car, etc.

BACKGROUND ART

An electrically-heated catalyst which is energized and heated for effectively cleaning exhaust gas is known from JP05-115795 A, for example. The electrically-heated catalyst includes a carrier and electrodes attached to the carrier for energizing the carrier. The electrodes supply the carrier with electric power supplied from an external electronic power supply such as a battery. The carrier is activated by being energized via the electrodes to be heated. In this way, with the electrically-heated catalyst, by energizing the carrier to heat it, it is possible to effectively clean the exhaust gas.

According to the electrically-heated catalyst which disclosed in JP05-115795 A, the carrier and the electrodes are made of ceramic and metal, and are secured to each other by soldering or welding. However, when the materials with different coefficients of thermal expansion are bonded (i.e., a ceramic-based material with a small coefficient of thermal expansion and a metal-based material with a great coefficient of thermal expansion are bonded directly), thermal stress is induced in the bonded surface due to the difference in the coefficients of thermal expansion. Hence, if the electrically-heated catalyst has the configuration in which the carrier and the electrodes whose coefficients of thermal expansion are significantly different from each other are bonded directly, there is a problem that the electrodes tend to peel off from the carrier due to the thermal stress induced in the bonded surface between the electrodes and the carrier, when they are used continuously under a situation where a temperature change occurs.

It may be contemplated that, instead of direct bonding between the electrodes and the carrier as described above, an underlying layer for releasing the thermal stress is provided between the electrodes and the carrier, and the electrodes as a whole are bonded with a fixing layer on the underlying layer. However, in the configuration in which the electrodes as a whole are bonded to the fixing layer formed by thermal spraying on the underlying layer, the electrodes cannot thermally expand or shrink freely when the thermal stress is induced in the bonding surface between the electrodes and the fixing layer or the bonding surface between the underlying layer and the fixing layer, and thus cracks or ruptures are easily generated at the electrodes, etc.

SUMMARY OF INVENTION

The present invention is made in consideration of the matters as described above, and it is an object of the present invention to provide an electrically-heated catalyst in which the cracks or ruptures of the electrodes can be prevented by reducing the thermal stress due to the difference in the coefficients of thermal expansion between the carrier and the electrodes.

The aforementioned object is achieved by an electrically-heated catalyst which comprises: a carrier; more than two comb-shaped electrode portions extending in a longitudinal direction; an electrically conductive underlying layer provided between the carrier and the comb-shaped electrode portions; and electrically conductive fixing layers bonding to the comb-shaped electrode portions and the underlying layer to fix the comb-shaped electrode portions to the carrier. The fixing layers are provided to be interspersed on the comb-shaped electrode portions and the underlying layer, and each of the comb-shaped electrode portions is fixed to the carrier by the fixing layers bonding to the comb-shaped electrode portion and the underlying layer locally at more than two points spaced apart.

According to the present invention, the cracks or ruptures of the comb-shaped electrode portions can be prevented by reducing the thermal stress due to the difference in the coefficients of thermal expansion between the carrier and the comb-shaped electrode portions.

Figure 1:
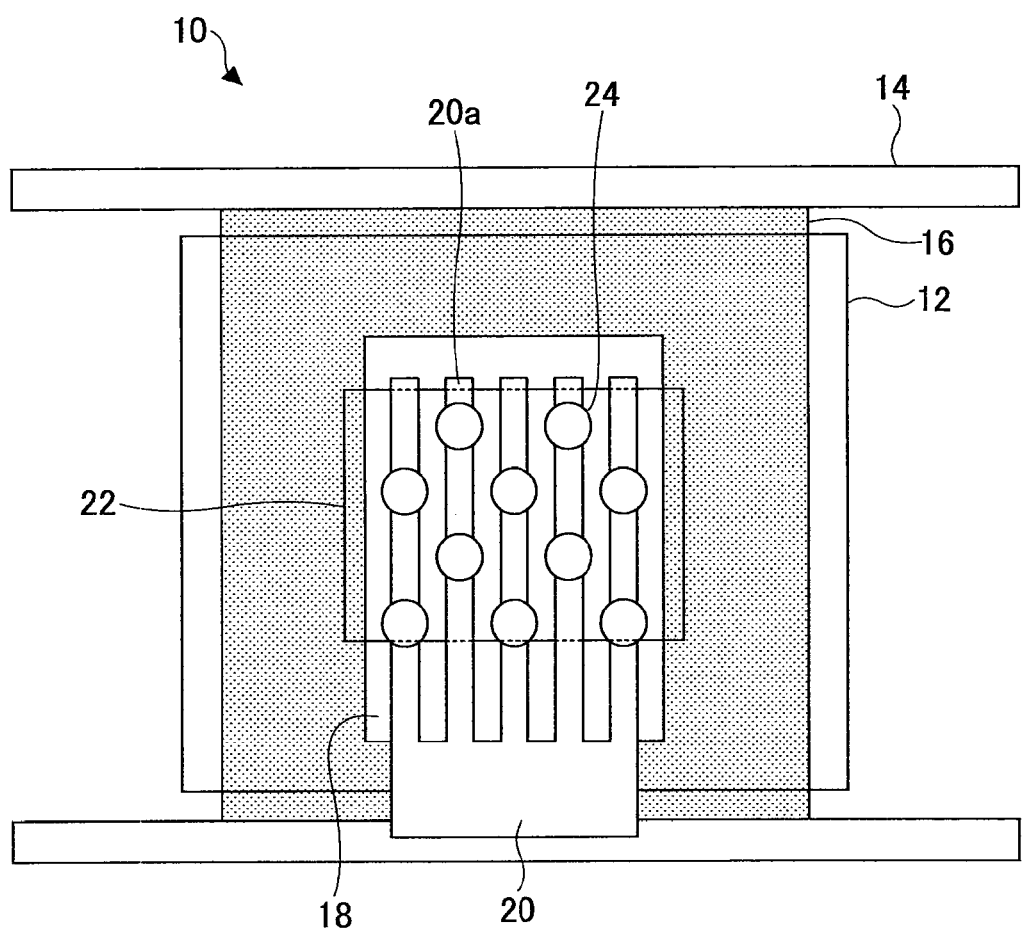
FIG. 1 is a diagram for illustrating a configuration of an electrically-heated catalyst according a first embodiment of the present invention.

EXPLANATION FOR REFERENCE NUMBERS 10, 100, 200, 300 electrically-heated catalyst 12 SiC carrier 20, 302 electrode 20a, 302a comb-shaped electrode portion 22 underlying layer
24, 102, 202, 304 fixing layer

BEST MODE FOR CARRYING OUT THE
INVENTION

In the following, concrete embodiments of the electrically-heated catalyst according the present invention will be described in detail by referring to the accompanying drawings.
[First Embodiment]

Figure 2A:
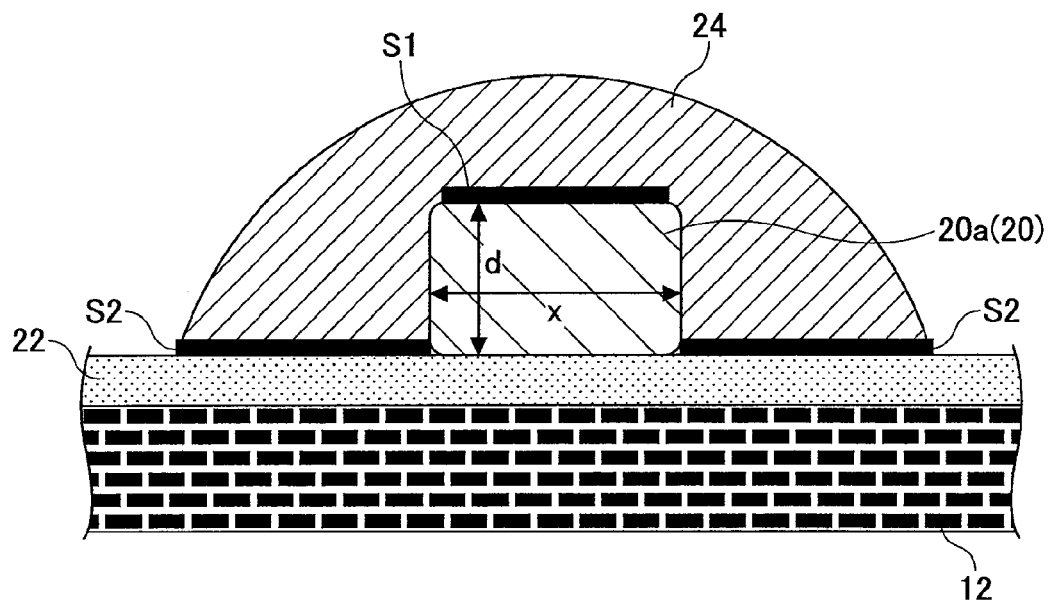
FIG. 2A is a cross-sectional view of main portions of the electrically-heated catalyst according the first embodiment of the present invention.
Figure 2B:
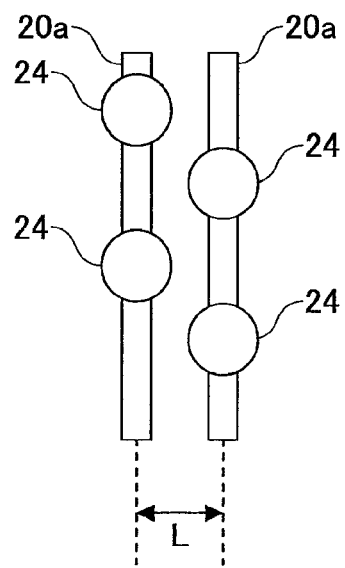
FIG. 2B is a top view of main portions of the electrically-heated catalyst according the first embodiment of the present invention.

FIG. 1 is a diagram for illustrating a configuration of an electrically-heated catalyst 10 according a first embodiment of the present invention. FIG. 2A is a cross-sectional view of main portions of the electrically-heated catalyst 10 according the embodiment. Further, FIG. 2B is a top view of main portions of the electrically-heated catalyst 10 according the embodiment. The electrically-heated catalyst 10 according the embodiment is a catalyst for cleaning exhaust gas from a car, etc., and is activated by being heated by energization.

The electrically-heated catalyst 10 includes a SiC carrier 12 which carries a ceramic catalyst formed of silicon carbide (SiC). The SiC carrier 12 is capable of activating the catalyst by being heated. The SiC carrier 12 is formed in a cylindrical shape. The SiC carrier 12 is held in a casing 14 formed in a cylindrical shape. A mat 16, which functions as electrically insulating layer and thermal insulation layer formed of alumina bulk fiber, for example, is provided between the SiC carrier 12 and an external tube of the casing 14. The SiC carrier 12 is held by the external tube of the casing 14 via the mat 16 over its overall outer peripheral surface. The mat 16 has a opening 18 formed therein.

The electrically-heated catalyst 10 further includes an electrode 20. The electrode 20 is secured to the SiC carrier 12. The electrode 20 is formed of an electrically-conductive metal (a stainless steel, for example). The electrode 20 is formed in a substantially planar shape (specifically, in a curved shape which follows an outer wall of the SiC carrier 12). Further, the electrode 20 is formed in a comb shape such that a plurality of teeth (for example, 12 teeth) extend in parallel in a longitudinal direction thereof. Hereinafter, the teeth of the electrode 20 are referred to as comb-shaped electrode portions 20a. The comb-shaped electrode portions 20a are disposed side by side and spaced from each other by a predetermined distance L along an axial direction of the SiC carrier 12 on the outer wall of the SiC carrier 12. Each of the comb-shaped electrode portions 20a has a predetermined line width x and a predetermined thickness d.

The electrode 20 is provided on the SiC carrier 12 via an electrically-conductive underlying layer 22. In other words, the underlying layer 22 is provided between the SiC carrier 12 and the electrode 20. The underlying layer 22 is a porous film, etc., formed on the surface of the SiC carrier 12 by thermal spraying. The underlying layer 22 is formed in a substantially planar shape (specifically, in a curved shape which follows the outer wall of the SiC carrier 12). The underlying layer 22 is provided on a part of the external wall of the SiC carrier 12 and has an area larger than that of the electrode 20 as a whole. The SiC carrier 22 is held by the external tube of the casing 14 via the mat 16 at its peripheral edge. The underlying layer 22 is formed of a metal material (NiCr-based material) which has a coefficient of thermal expansion between a coefficient of thermal expansion of the SiC carrier 12 (which is relatively small) and a coefficient of thermal expansion of the electrode 20 (which is relatively great). The underlying layer 22 has a function of absorbing the difference in thermal expansions generated between the SiC carrier 12 and the electrode 20.

The electrically-heated catalyst 10 further includes fixing layers 24 for fixing the electrode 20 to the SiC carrier 12. The fixing layers 24 bond to the electrode 20 and the SiC carrier 12. It is noted that in FIG. 2A a bonding surface S1 between the fixing layer 24 and the electrode 20 and a bonding surface S2 between the fixing layer 24 and the underlying layer 22 are indicated by bold solid lines. The electrode 20 is fixed to the SiC carrier 12 by the fixing layers 24 bonding to the comb-shaped electrode portions 20a and the underlying layer 22.

The fixing layers 24 are formed on the surfaces of the comb-shaped electrode portions 20a and the underlying layer 22 by thermal spraying. The fixing layers 24 are bonded to the comb-shaped electrode portions 20a and the underlying layer 22 by thermal spraying. The fixing layers 24 are formed of a metal material (NiCr-based material and CoNiCr-based material, for example) which has a coefficient of thermal expansion between a coefficient of thermal expansion of the underlying layer 22 and a coefficient of thermal expansion of the electrode 20. The fixing layers 24 are electrically conductive. The fixing layers 24 are disposed at several locations in a discrete manner on the surfaces of the comb-shaped electrode portions 20a and the underlying layer 22, and bond locally to the comb-shaped electrode portions 20a and the underlying layer 22.

The fixing layers 24 are formed in a hemispherical shape on the surfaces of the comb-shaped electrode portions 20a and the underlying layer 22. The fixing layers 24 have a diameter larger than the line width x of the comb-shaped electrode portions 20a of the electrode 20. The fixing layers 24 are located in such a manner that their apexes are positioned on the center lines of the comb-shaped electrode portions 20a, and they connect the comb-shaped electrode portions 20a and surface portions of the underlying layer 22, which surface portions are located on the opposite sides of the comb-shaped electrode portions 20a in a direction perpendicular to the longitudinal direction of the comb-shaped electrode portions 20a. In other words, as shown in FIG. 2A and FIG. 2B, each of the fixing layers 24 bonds to the corresponding comb-shaped electrode portion 20a and surface portions of the underlying layer 22, which surface portions are located on the opposite sides of the corresponding comb-shaped electrode portion 20a in a direction perpendicular to the longitudinal direction of the corresponding comb-shaped electrode portion 20a.

The side surfaces on the opposite sides of the comb-shaped electrode portions 20a in a direction perpendicular to the longitudinal direction of the comb-shaped electrode portions 20a are covered with the fixing layers 24. The bonding of the fixing layers 24 to the comb-shaped electrode portions 20a and the underlying layer 22 is implemented by thermal spraying the fixing layers 24 toward the center of the comb-shaped electrode portions 20a from an upper side of the electrode 20 placed on the underlying layer 22.

A plurality of the fixing layers 24 (two spots in FIG. 2B) are provided for each of the comb-shaped electrode portions 20a of the electrode 20 and are placed apart with respect to each other. Each of the comb-shaped electrode portions 20a is bonded locally to the fixing layers 24 at several points spaced apart. Each of the comb-shaped electrode portions 20a is fixed to the SiC carrier 12 by the fixing layers 24 bonding to the comb-shaped electrode portions 20a and the underlying layer 22 locally at several points spaced apart. With respect to the neighboring comb-shaped electrode portions 20a in the axial direction of the SiC carrier 12, the fixing layers 24 are located in a staggered arrangement on the underlying layer 22.

Figure 3:
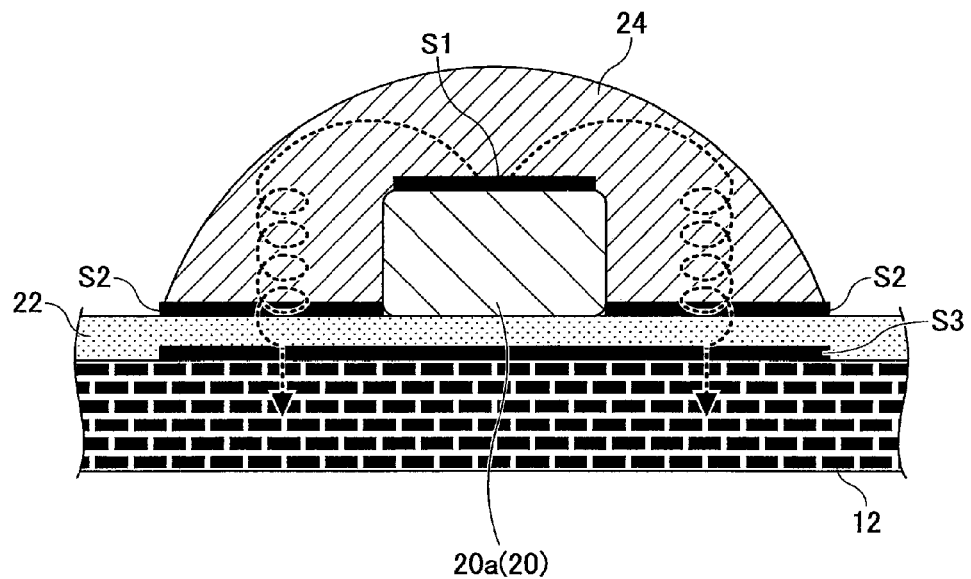
FIG. 3 is a diagram for illustrating a current flow in the electrically-heated catalyst according the first embodiment of the present invention.

FIG. 3 is a diagram for illustrating a current flow in the electrically-heated catalyst 10 according to the embodiment. It is noted that in FIG. 3 a bonding surface S1 between the fixing layer 24 and the electrode 20, a bonding surface S2 between the fixing layer 24 and the underlying layer 22 and a bonding surface S3 between the underlying layer 22 and the SiC carrier 12 are indicated by bold solid lines.

When a current is applied to the electrode by a wire from the external source in the electrically-heated catalyst 10 according to the embodiment, the current passes to the SiC carrier 12 via the comb-shaped electrode portions 20a, the fixing layers 24 and the underlying layer 22. Specifically, as shown by arrows in FIG. 3, the current passes through the fixing layers 24 from the comb-shaped electrode portion 20a via the bonding surface S1 between the comb-shaped electrode portion 20a and the fixing layer 24, thereafter passes through the underlying layer 22 from the fixing layer 24 via the bonding surface S2 between the fixing layer 24 and the underlying layer 22, and then passes to the SiC carrier 12 from the underlying layer 22 via the bonding surface S3 between the underlying layer 22 and the SiC carrier 12.

When such energization is performed, the SiC carrier 12 is heated. The SiC carrier 12 is capable of cleaning the exhaust gas by being activated when it is heated. In this way, according to the electrically-heated catalyst 10 of the embodiment, by energizing the SiC carrier 12 to heat it, it is possible to effectively clean the exhaust gas.

Further, according to the electrically-heated catalyst 10 of the embodiment, between the metal electrode 20 and the ceramic SiC carrier 12 is provided the underlying layer 22 formed of a metal material which has a coefficient of thermal expansion between a coefficient of thermal expansion of the electrode 20 and a coefficient of thermal expansion of the SiC carrier 12. Hence, when the electrically-heated catalyst 10 thermally expands or shrinks during a thermal shock cycle (in which the temperature may rise to 800 degree Celsius, for example), the difference in the thermal expansion generated between the SiC carrier 12 and the electrode 20 is accommodated by the underlying layer 22 and thus the thermal stress applied between the SiC carrier 12 and the electrode 20 can be reduced or released. Therefore, it is possible to prevent the electrode 20 from peeling off from the SiC carrier 12 due to the thermal stress during a thermal shock cycle or prevent cracks or ruptures of the electrode 20 due to the thermal stress during the thermal shock cycle.

It is noted that the greater the thickness of the underlying layer 22 interposed between the electrode 20 and the SiC carrier 12 becomes, the more the thermal stress applied between the SiC carrier 12 and the electrode 20 is reduced or released, but the greater an electric resistivity of the underlying layer 22 becomes, which prevents the current from effectively passing to the SiC carrier 12 from the electrode 20 via the fixing layers 24 and the underlying layer 22. Therefore, the thickness of the underlying layer 22 interposed between the electrode 20 and the SiC carrier 12 is set in such a manner that the reduction in the thermal stress between the SiC carrier 12 and the electrode 20 is compatible with the energization efficiency.

Further, according to the electrically-heated catalyst 10 of the embodiment, each of the comb-shaped electrode portions 20a is fixed to the SiC carrier 12 which bonds to the underlying layer 22, by bonding the fixing layers 24 to the comb-shaped electrode portions 20a and the underlying layer 22 on the SiC carrier 12. The fixing of the comb-shaped electrode portion 20a to the SiC carrier 12 is implemented by the bonding of the comb-shaped electrode portion 20a to the fixing layers 24 locally at several points spaced apart. Thus, each of the comb-shaped electrode portions 20a is fixed to the SiC carrier 12 by the fixing layers 24 bonding to the comb-shaped electrode portions 20a and the underlying layer 22 locally at several points spaced apart.

According to such a configuration, the comb-shaped electrode portions 20a are constrained by being bonded to the fixing layers 24 locally at several points spaced apart, while portions between the bonded portions thereof, which are not bonded to any layers, can expand and shrink freely in portions without being constrained on the underlying layer 22. Specifically, the comb-shaped electrode portions 20a have only portions fixed to the SiC carrier 12 by being bonded to the fixing layers 24 together with the adjacent underlying layer 22 but have other portions which are permitted to deform freely.

Therefore, when the electrically-heated catalyst 10 thermally expands or shrinks during the thermal shock cycle, displacements of the comb-shaped electrode portions 20a due to the thermal expansion or the thermal shrinkage can be accommodated by the deformation of the portions of the comb-shaped electrode portions 20a between the portions bonded to the fixing layers 24. Further, the thermal stress applied between the SiC carrier 12 and the comb-shaped electrode portions 20a of the electrode 20 can be reduced or released with respect to the configuration in which overall back surfaces of the comb-shaped electrode portions 20a are constrained by being bonded to the fixing layers 24. Thus, according to the configuration of the electrically-heated catalyst 10 of the embodiment, cracks or ruptures of the comb-shaped electrode portions 20a of the electrode 20 due to the effect of the thermal stress during the thermal shock cycle can be prevented.

Further, according to the electrically-heated catalyst 10 of the embodiment, the fixing layers 24, which fix the comb-shaped electrode portions 20a to the SiC carrier 12, are arranged in a staggered arrangement on the surface of the underlying layer 22 with respect to the neighboring comb-shaped electrode portions 20a in the axial direction of the SiC carrier 12. The fixing layers 24 are formed in a hemispherical shape on the underlying layer 22 by thermal spraying and have a diameter greater than the line width x of the comb-shaped electrode portions 20a. Thus, according to the configuration of the electrically-heated catalyst 10 of the embodiment, the spaced distance L between the neighboring comb-shaped electrode portions 20a in the axial direction of the SiC carrier 12 can be made smaller in comparison with the configuration in which the fixing layers 24 are arranged side by side in the axial direction with respect to the neighboring comb-shaped electrode portions 20a in the axial direction of the SiC carrier 12. Therefore, it is possible to make an area occupied by the electrode 20 as a whole on the surface of the SiC carrier 12 smaller, and make the electrode 20 and the underlying layer 22 more compact.

It is noted that in the first embodiment as described above the SiC carrier 12 corresponds to "a carrier" in claims.

[Second Embodiment]

In the first embodiment as described above, the diameter of the fixing layers 24 is greater than the line width x of the comb-shaped electrode portions 20a, and each of the fixing layers 24 bonds to the corresponding comb-shaped electrode portion 20a and surface portions of the underlying layer 22, which surface portions are located on the opposite sides of the corresponding comb-shaped electrode portion 20a in a direction perpendicular to the longitudinal direction of the corresponding comb-shaped electrode portion 20a. To the contrary, according to the second embodiment, each of the fixing layers bonds to the corresponding comb-shaped electrode portion 20a and only one of surface portions of the underlying layer 22, which surface portions are located on the opposite sides of the corresponding comb-shaped electrode portion 20a in a direction perpendicular to the longitudinal direction of the corresponding comb-shaped electrode portion 20a.

Figure 4A:
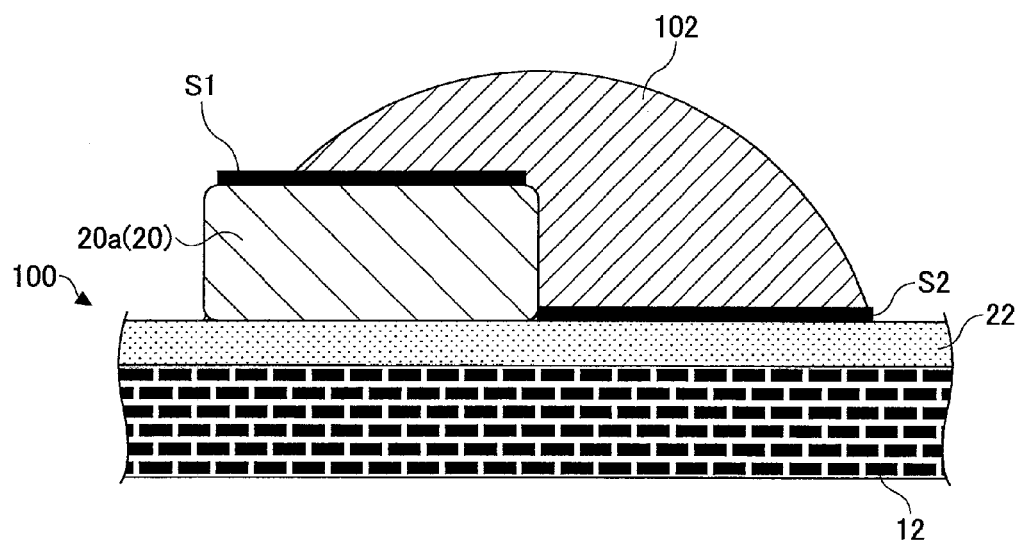
FIG. 4A is a cross-sectional view of main portions of the electrically-heated catalyst according a second embodiment of the present invention.
Figure 4B:
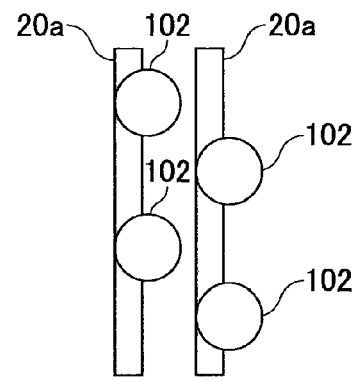
FIG. 4B is a top view of main portions of the electrically-heated catalyst according the second embodiment of the present invention.

FIG. 4A is a cross-sectional view of main portions of an electrically-heated catalyst 100 according the embodiment. Further, FIG. 4B is a top view of main portions of the electrically-heated catalyst 100 according the embodiment. It is noted that in FIG. 4A and FIG. 4B the same numeral references are used for the same elements shown in FIG. 1, FIG. 2A and FIG. 2B, and the explanation of these elements is omitted or simplified.

The electrically-heated catalyst 100 includes fixing layers 102 for fixing the electrode 20 to the SiC carrier 12. The fixing layers 102 have substantially the same shape and functions as the fixing layers 24 as described above and formed of substantially the same material as the fixing layers 24. The fixing layers 102 bond to the comb-shaped electrode portions 20a and the underlying layer 22 by thermal spraying. The electrode 20 is fixed to the SiC carrier 12 by the fixing layers 102 bonding to the comb-shaped electrode portions 20a and the underlying layer 22. The fixing layers 102 are disposed at several locations in a discrete manner on the surfaces of the comb-shaped electrode portions 20a and the underlying layer 22, and bond locally to the comb-shaped electrode portions 20a and the underlying layer 22.

The fixing layers 102 are formed in a hemispherical shape on the surfaces of the comb-shaped electrode portions 20a and the underlying layer 22. The fixing layers 102 have a diameter larger than the line width x of the comb-shaped electrode portions 20a of the electrode 20. The fixing layers 102 are located in such a manner that their apexes are positioned on the lines which are slightly shifted from the center lines of the comb-shaped electrode portions 20a, and they connect the corresponding comb-shaped electrode portions 20a and the corresponding one of surface portions of the underlying layer 22, which surface portions are located on the opposite sides of the comb-shaped electrode portions 20a in a direction perpendicular to the longitudinal direction of the comb-shaped electrode portions 20a. In other words, as shown in FIG. 4A and FIG. 4B, each of the fixing layers 102 bonds to the corresponding comb-shaped electrode portion 20a and only one of the surface portions of the underlying layer 22, which surface portions are located on the opposite sides of the corresponding comb-shaped electrode portion 20a in a direction perpendicular to the longitudinal direction of the corresponding comb-shaped electrode portion 20a.

One of the side surfaces on the opposite sides of the comb-shaped electrode portions 20a in a direction perpendicular to the longitudinal direction of the comb-shaped electrode portions 20a is covered with the fixing layers 102, while the other is exposed to the outside. The bonding of the fixing layers 102 to the comb-shaped electrode portions 20a and the underlying layer 22 is implemented by thermal spraying the fixing layers 102 toward a location which is slightly shifted from the center of the comb-shaped electrode portions 20a from an upper side of the electrode 20 placed on the underlying layer 22.

A plurality of fixing layers 102 (two spots in FIG. 4B) are provided for each of the comb-shaped electrode portions 20a of the electrode 20 and are placed apart with respect to each other. Each of the comb-shaped electrode portions 20a is bonded locally to the fixing layers 102 at several points spaced apart. With respect to the neighboring comb-shaped electrode portions 20a in the axial direction of the SiC carrier 12, the fixing layers 102 are located in a staggered arrangement on the underlying layer 22.

When a current is applied to the electrode by a wire from the external source in the electrically-heated catalyst 100 according to the embodiment, the current passes to the SiC carrier 12 via the comb-shaped electrode portions 20a, the fixing layers 102 and the underlying layer 22. When such energization is performed, the SiC carrier 12 is heated. In this way, according to the electrically-heated catalyst 100, by energizing the SiC carrier 12 to heat it, it is possible to effectively clean the exhaust gas.

Further, according to the electrically-heated catalyst 100 of the embodiment, each of the comb-shaped electrode portions 20a is fixed to the SiC carrier 12 which bonds to the underlying layer 22, by bonding the fixing layers 102 to the comb-shaped electrode portions 20a and the underlying layer 22 on the SiC carrier 12. The fixing of the comb-shaped electrode portion 20a to the SiC carrier 12 is implemented by the bonding of the comb-shaped electrode portion 20a to the fixing layers 102 locally at several points spaced apart. Thus, according to the configuration of the electrically-heated catalyst 100 of the embodiment, as is the case with the electrically-heated catalyst 10 according to the first embodiment, cracks or ruptures of the comb-shaped electrode portions 20a of the electrode 20 due to the effect of the thermal stress during the thermal shock cycle can be prevented. Further, with respect to the neighboring comb-shaped electrode portions 20a in the axial direction of the SiC carrier 12, the fixing layers 102 are located in a staggered arrangement on the underlying layer 22. Therefore, according to the configuration of the electrically-heated catalyst 100 of the embodiment, as is the case with the electrically-heated catalyst 10 according to the first embodiment, it is possible to make an area occupied by the electrode 20 as a whole on the surface of the SiC carrier 12 smaller, and make the electrode 20 and the underlying layer 22 more compact.

Further, according to the electrically-heated catalyst 100 of the embodiment, each of the fixing layers 102 bonds to the corresponding comb-shaped electrode portion 20a and only one of surface portions of the underlying layer 22, which surface portions are located on the opposite sides of the corresponding comb-shaped electrode portion 20a in a direction perpendicular to the longitudinal direction of the corresponding comb-shaped electrode portion 20a, as described above. One of the side surfaces on the opposite sides of the comb-shaped electrode portions 20a in a direction perpendicular to the longitudinal direction of the comb-shaped electrode portions 20a is covered with the fixing layers 102, while the other is exposed to the outside without adjoining to the fixing layers 10. According to such a configuration, it is possible to increase a degree of freedom of expansion or shrinkage of the comb-shaped electrode portions 20a in comparison with the configuration in which both of the side surfaces on the opposite sides of the comb-shaped electrode portions 20a in a direction perpendicular to the longitudinal direction of the comb-shaped electrode portions 20a are covered with the fixing layers 102.

Therefore, when the electrically-heated catalyst 100 thermally expands or shrinks during the thermal shock cycle, displacements of the comb-shaped electrode portions 20a due to the thermal expansion or the thermal shrinkage can be accommodated by the deformation of the portions of the comb-shaped electrode portions 20a between the bonded portions to the fixing layers 102. Further, the thermal stress applied between the SiC carrier 12 and the comb-shaped electrode portions 20a of the electrode 20 can be reduced or released with respect to the configuration in which the comb-shaped electrode portions 20a as a whole are constrained by being bonded to the fixing layers 102. Thus, according to the configuration of the electrically-heated catalyst 100 of the embodiment, cracks or ruptures of the comb-shaped electrode portions 20a of the electrode 20 due to the effect of the thermal stress during the thermal shock cycle can be prevented.

[Third Embodiment]

In the first and second embodiments as described above, a plurality of fixing layers 24, 102 are provided for each of the comb-shaped electrode portions 20a of the electrode 20 and are placed apart with respect to each other. To the contrary, according to the third embodiment of the present invention, the fixing layers are shared with the neighboring comb-shaped electrode portions 20a in the axial direction of the SiC carrier 12 (i.e., in the direction perpendicular to the longitudinal direction of the comb-shaped electrode portions 20a). In other words, the bonding of the fixing layer to the comb-shaped electrode portions 20a and the underlying layer 22 is performed in such a manner that the fixing layer straddles two comb-shaped electrode portions 20a which are neighboring in the direction perpendicular to the longitudinal direction of the comb-shaped electrode portions 20a.

Figure 5A:
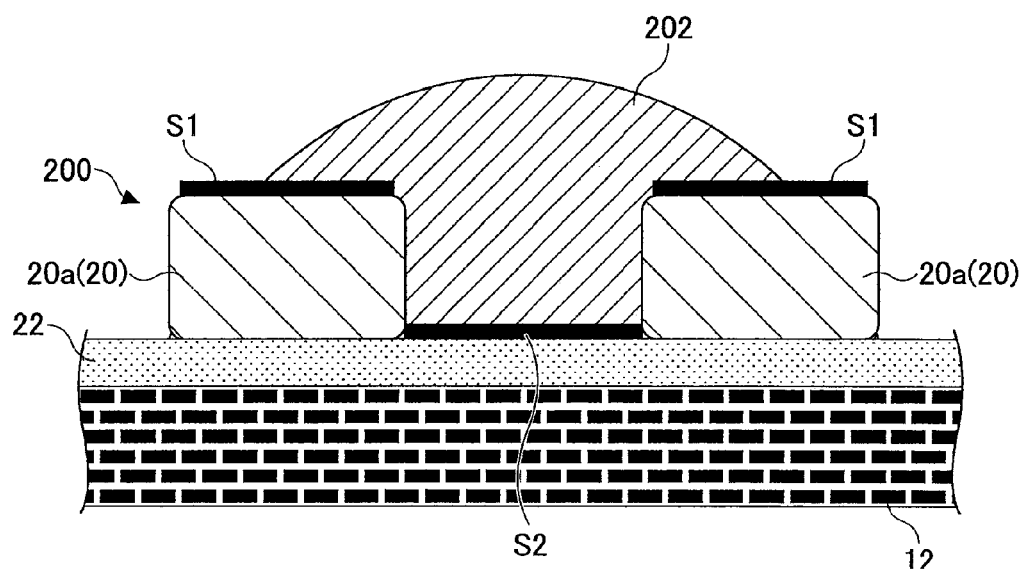
FIG. 5A is a cross-sectional view of main portions of the electrically-heated catalyst according a third embodiment of the present invention.
Figure 5B:
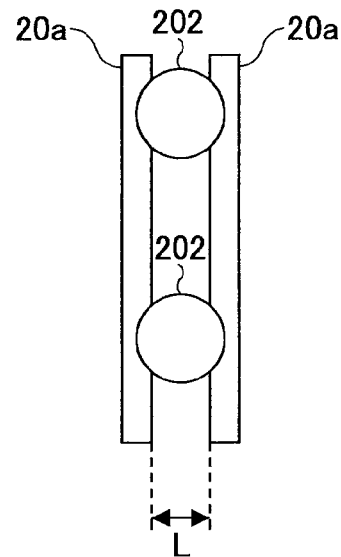
FIG. 5B is a top view of main portions of the electrically-heated catalyst according the third embodiment of the present invention.

FIG. 5A is a cross-sectional view of main portions of an electrically-heated catalyst 200 according the embodiment. Further, FIG. 5B is a top view of main portions of the electrically-heated catalyst 200 according the embodiment. It is noted that in FIG. 5A and FIG. 5B the same numeral references are used for the same elements shown in FIG. 1, FIG. 2A and FIG. 2B, and the explanation of these elements is omitted or simplified.

The electrically-heated catalyst 200 includes fixing layers 202 for fixing the electrode 20 to the SiC carrier 12. The fixing layers 202 have substantially the same shape and functions as the fixing layers 24, 102 as described above and formed of substantially the same material as the fixing layers 24, 102. The fixing layers 202 bond to the comb-shaped electrode portions 20a and the underlying layer 22 by thermal spraying. The electrode 20 is fixed to the SiC carrier 12 by the fixing layers 202 bonding to the comb-shaped electrode portions 20a and the underlying layer 22. The fixing layers 202 are disposed at several locations in a discrete manner on the surfaces of the comb-shaped electrode portions 20a and the underlying layer 22, and bond locally to the comb-shaped electrode portions 20a and the underlying layer 22.

The fixing layers 202 are formed in a hemispherical shape on the surfaces of the comb-shaped electrode portions 20a and the underlying layer 22. Each of the fixing layers 202 has a diameter which is greater than the spaced distance L between the neighboring comb-shaped electrode portions 20a in the axial direction of the SiC carrier 12. Each of the fixing layers 202 is located in such a manner that its apex is positioned on the middle line of two neighboring comb-shaped electrode portions 20a, and it connects the corresponding two neighboring comb-shaped electrode portions 20a and a surface portion of the underlying layer 22, which surface portion is located between the corresponding two neighboring comb-shaped electrode portions 20a. In other words, as shown in FIG. 5A and FIG. 5B, each of the fixing layers 202 bonds to the corresponding two neighboring comb-shaped electrode portion 20a and a surface portion of the underlying layer 22, which surface portion is located between the corresponding two neighboring comb-shaped electrode portions 20a.

One of the side surfaces on the opposite sides of the comb-shaped electrode portions 20a in a direction perpendicular to the longitudinal direction of the comb-shaped electrode portions 20a is covered with the fixing layers 202, while the other is exposed to the outside. The bonding of the fixing layers 202 to the comb-shaped electrode portions 20a and the underlying layer 22 is implemented by thermal spraying the fixing layers 202 toward the midpoints of the respective two neighboring comb-shaped electrode portions 20a from an upper side of the electrode 20 placed on the underlying layer 22. A plurality of fixing layers 202 (two spots in FIG. 5B) are provided for each of the comb-shaped electrode portions 20a of the electrode 20 and are placed apart with respect to each other. Each of the comb-shaped electrode portions 20a is bonded locally to the fixing layers 202 at several points spaced apart.

When a current is applied to the electrode by a wire from the external source in the electrically-heated catalyst 200 according to the embodiment, the current passes to the SiC carrier 12 via the comb-shaped electrode portions 20a, the fixing layers 202 and the underlying layer 22. When such energization is performed, the SIC carrier 12 is heated. In this way, according to the electrically-heated catalyst 200, by energizing the SiC carrier 12 to heat it, it is possible to effectively clean the exhaust gas.

Further, according to the electrically-heated catalyst 200 of the embodiment, each of the comb-shaped electrode portions 20a is fixed to the SiC carrier 12 which bonds to the underlying layer 22, by bonding the fixing layers 202 to the comb-shaped electrode portions 20a and the underlying layer 22 on the SiC carrier 12. The fixing of the comb-shaped electrode portion 20a to the SiC carrier 12 is implemented by the bonding of the comb-shaped electrode portion 20a to the fixing layers 102 locally at several points spaced apart. Thus, according to the configuration of the electrically-heated catalyst 200 of the embodiment, as is the case with the electrically-heated catalyst 10, 100 according to the first and second embodiments, cracks or ruptures of the comb-shaped electrode portions 20a of the electrode 20 due to the effect of the thermal stress during the thermal shock cycle can be prevented.

Further, according to the electrically-heated catalyst 200 of the embodiment, as described above, each of the fixing layers 202 bonds to the corresponding two neighboring comb-shaped electrode portion 20a and the surface portion of the underlying layer 22 located between the corresponding two neighboring comb-shaped electrode portions 20a. One of the side surfaces on the opposite sides of the comb-shaped electrode portions 20a in a direction perpendicular to the longitudinal direction of the comb-shaped electrode portions 20a is covered with the fixing layers 102, while the other is exposed to the outside without adjoining to the fixing layers 10. According to such the configuration, it is possible to increase a degree of freedom of expansion or shrinkage of the comb-shaped electrode portions 20a in comparison with the configuration in which both of the side surfaces on the opposite sides of the comb-shaped electrode portions 20a in a direction perpendicular to the longitudinal direction of the comb-shaped electrode portions 20a are covered with the fixing layers 102.

Therefore, when the electrically-heated catalyst 200 thermally expands or shrinks during the thermal shock cycle, displacements of the comb-shaped electrode portions 20a due to the thermal expansion or the thermal shrinkage can be accommodated by the deformation of the portions of the comb-shaped electrode portions 20a between the bonded portions to the fixing layers 202. Further, the thermal stress applied between the SiC carrier 12 and the comb-shaped electrode portions 20a of the electrode 20 can be reduced or released with respect to the configuration in which the comb-shaped electrode portions 20a as a whole are constrained by being bonded to the fixing layers 202. Thus, according to the configuration of the electrically-heated catalyst 200 of the embodiment, cracks or ruptures of the comb-shaped electrode portions 20a of the electrode 20 due to the effect of the thermal stress during the thermal shock cycle can be prevented.

Further, according to the electrically-heated catalyst 200 of the embodiment, each of the fixing layers 202 bonds to the corresponding two neighboring comb-shaped electrode portion 20a and the surface portion of the underlying layer 22 located between the corresponding two neighboring comb-shaped electrode portions 20a. In other words, the bonding of each of the fixing layers 202 to the comb-shaped electrode portions 20a and the underlying layer 22 is performed in such a manner that each of the fixing layers 202 straddles two corresponding comb-shaped electrode portions 20a which are neighboring in the direction perpendicular to the longitudinal direction of the comb-shaped electrode portions 20a. The two comb-shaped electrode portions 20a which are neighboring in the axial direction of the SiC carrier are bonded at their bonding points by the corresponding common fixing layers 202.

According to such a configuration, it is possible to reduce a time required to manufacture the electrically-heated catalyst 200 because the total number of the fixing layers 202 required to fix all the comb-shaped electrode portions 20a on the SiC carrier 12 is reduced by one-half in comparison with the configurations according to the first and second embodiments. It is noted that even such a configuration does not affect the function of reducing or releasing the thermal stress applied between the SiC carrier 12 and the comb-shaped electrode portions 20a of the electrode 20, as is the case with the configurations according to the first and second embodiments. Thus, according to the configuration of the electrically-heated catalyst 200 of the embodiment, it is possible to reduce the production time and cost while reducing or releasing the thermal stress applied between the SiC carrier 12 and the comb-shaped electrode portions 20a of the electrode 20.

It is noted that in the third embodiment as described above each of the fixing layers 202 straddles two corresponding comb-shaped electrode portions 20a which are neighboring in the axial direction of the SiC carrier 12; however, the fixing layers 202 may straddle three or more comb-shaped electrode portions 20a neighboring in the axial direction of the SiC carrier 12.

[Fourth Embodiment]

Figure 6A:
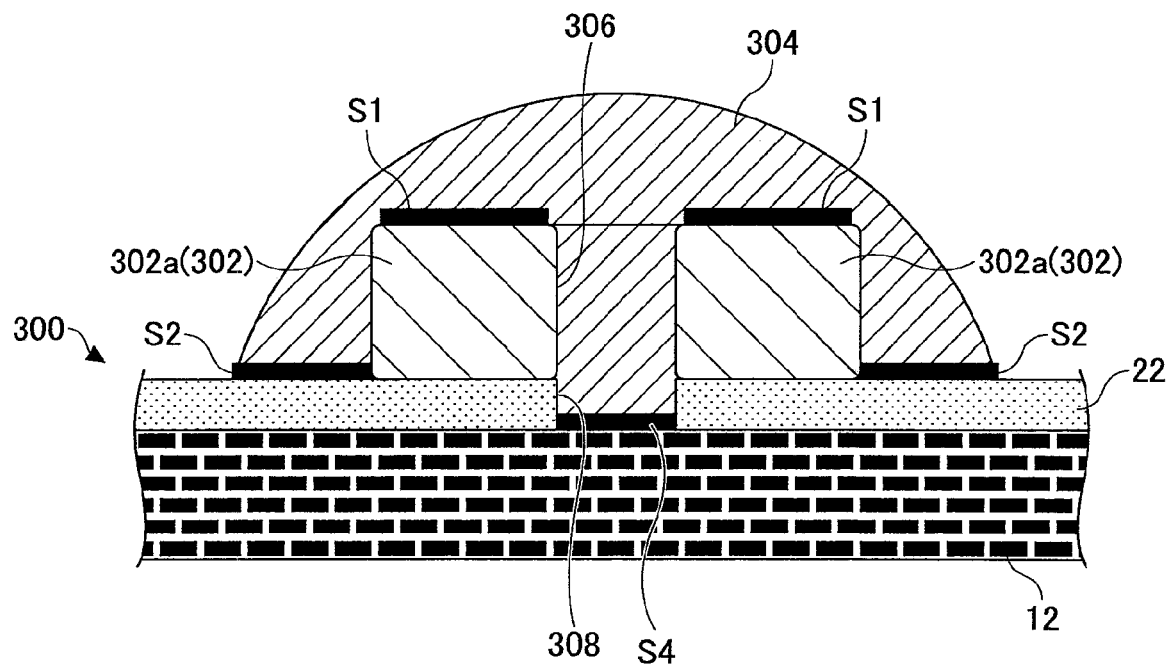
FIG. 6A is a cross-sectional view of main portions of the electrically-heated catalyst according a fourth embodiment of the present invention.
Figure 6B:
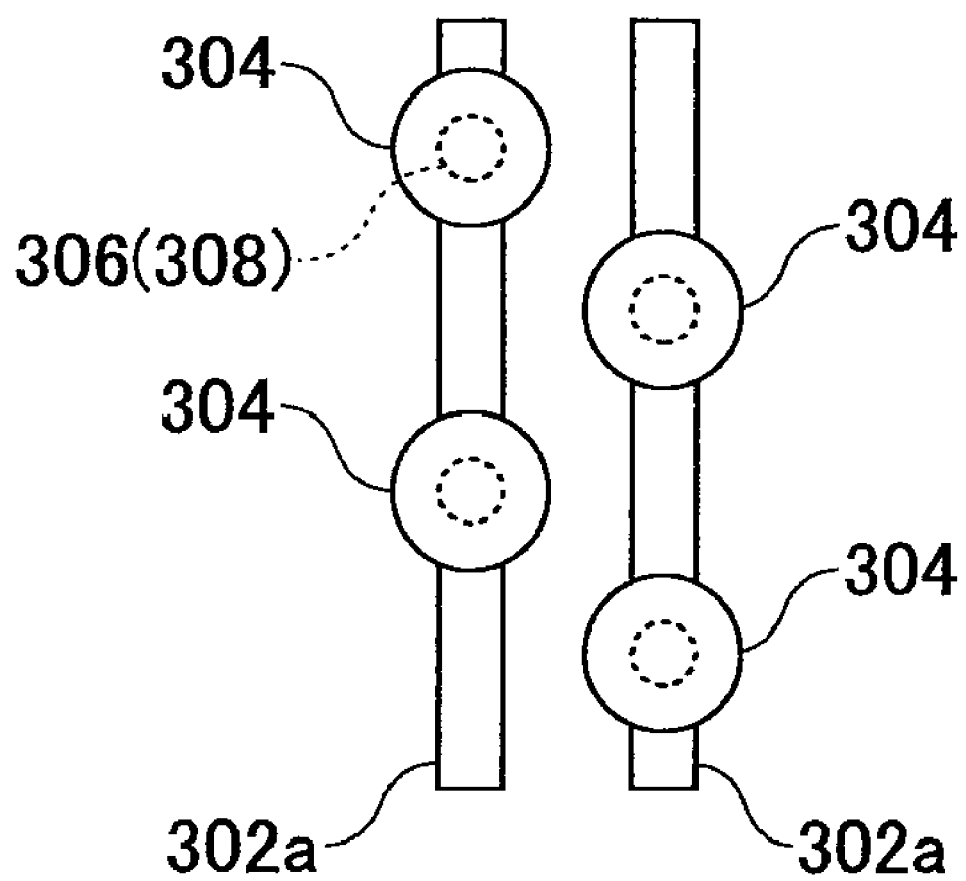
FIG. 6B is a top view of main portions of the electrically-heated catalyst according the fourth embodiment of the present invention.

FIG. 6A is a cross-sectional view of main portions of an electrically-heated catalyst 300 according the fourth embodiment. Further, FIG. 6B is a top view of main portions of the electrically-heated catalyst 300 according the embodiment. It is noted that in FIG. 6A and FIG. 6B the same numeral references are used for the same elements shown in FIG. 1, FIG. 2A and FIG. 2B, and the explanation of these elements are omitted or simplified.

The electrically-heated catalyst 300 includes an electrode 302. The electrode 302 has substantially the same shape and functions as the electrode 20 as described above and formed of substantially the same material as the electrode 20. It is noted that the respective teeth of the electrode 302 are referred to as comb-shaped electrode portions 302a. The comb-shaped electrode portions 302a are disposed side by side the and spaced from each other by a predetermined distance L along a axial direction of the SiC carrier 12 on the outer wall of the SiC carrier 12. The electrode 302 is provided on the SiC carrier 12 via the underlying layer 22.

The electrically-heated catalyst 300 further includes fixing layers 304 for fixing the electrode 302 to the SiC carrier 12. The fixing layers 304 have substantially the same shape and functions as the fixing layers 24 as described above and are formed of substantially the same material as the fixing layers 24. The fixing layers 304 bond to the comb-shaped electrode portions 302a and the underlying layer 22 by thermal spraying. The electrode 302 is fixed to the SiC carrier 12 by the fixing layers 304 bonding to the comb-shaped electrode portions 302a and the underlying layer 22. The fixing layers 304 are disposed at several locations in a discrete manner on the surfaces of the comb-shaped electrode portions 302a and the underlying layer 22, and bond locally to the comb-shaped electrode portions 302a and the underlying layer 22.

The fixing layers 304 are formed in a hemispherical shape on the surfaces of the comb-shaped electrode portions 302a and the underlying layer 22. The fixing layers 304 have a diameter larger than the line width x of the comb-shaped electrode portions 302a of the electrode 302. The fixing layers 304 are located in such a manner that their apexes are located at the center lines of the corresponding comb-shaped electrode portions 302a, and they connect the comb-shaped electrode portions 302a and surface portions of the underlying layer 22, which surface portions are located on the opposite sides of the comb-shaped electrode portions 302a in a direction perpendicular to the longitudinal direction of the comb-shaped electrode portions 302a. In other words, as shown in FIG. 6A and FIG. 6B, each of the fixing layers 304 bonds to the corresponding comb-shaped electrode portion 302a and surface portions of the underlying layer 22, which surface portions are located on the opposite sides of the corresponding comb-shaped electrode portion 302a in a direction perpendicular to the longitudinal direction of the corresponding comb-shaped electrode portion 302a.

The side surfaces on the opposite sides of the comb-shaped electrode portions 302a in a direction perpendicular to the longitudinal direction of the comb-shaped electrode portions 20a are covered with the fixing layers 304. The bonding of the fixing layers 304 to the comb-shaped electrode portions 302a and the underlying layer 22 is implemented by thermal spraying the fixing layers 304 toward the center of the comb-shaped electrode portions 302a from an upper side of the electrode 302 placed on the underlying layer 22.

A plurality of fixing layers 304 (two spots in FIG. 6B) are provided for each of the comb-shaped electrode portions 302a of the electrode 302 and are placed apart with respect to each other. Each of the comb-shaped electrode portions 302a is bonded locally to the fixing layers 304 at several points spaced apart. Each of the comb-shaped electrode portions 302a are fixed to the SiC carrier 12 by the fixing layers 304 bonding to the comb-shaped electrode portions 302a and the underlying layer 22 locally at several points spaced apart. With respect to the neighboring comb-shaped electrode portions 302a in the axial direction of the SiC carrier 12, the fixing layers 304 are located in a staggered arrangement on the underlying layer 22.

Further, the comb-shaped electrode portions 302a have through holes 306 passing therethrough toward the underlying layer 22 or the SiC carrier 12. The through holes 306 are provided at portions to which the fixing layers 304 are bonded. Further, the underlying layer 22 has through holes 308 passing therethrough toward the SiC carrier 12. The through holes 308 are provided at regions where the fixing layers 304 are bonded to the comb-shaped electrode portions 302a. The through holes 306 are in communication with the corresponding through holes 308. The through holes 306 of the comb-shaped electrode portions 302a are filled with the fixing layers 304, and the through holes 308 of the underlying layer 22 are filled with the fixing layers 304. The fixing layers 304 are formed in such a manner that the centerlines of the through holes 306, 308 pass through the apexes of the corresponding fixing layers 304 (i.e., in such a manner that the through holes 306, 308 are located substantially at the centers of the fixing layers 304 when viewed from an upper side), as shown in FIG. 6B.

In the electrically-heated catalyst 300 according to the embodiment, the thermal spraying of the fixing layers 304 is directed to the centers of the comb-shaped electrode portions 302a from an upper side of the electrode 302 placed on the underlying layer 22 in order to implement the bonding between the fixing layers 304 and the electrode 302 and the bonding between the fixing layers 304 and the underlying layer 22. When such a thermal spraying is performed, the fixing layers 304 reach the surface of the SiC carrier 12 through the through holes 306 of the comb-shaped electrode portions 302a and the through holes 308 of the underlying layer 22, and thus the fixing layers 304 directly bond to the SiC carrier 12. It is noted that in FIG. 6A a bonding surface S4 between the fixing layers 304 and the SiC carrier 12 is indicated by a bold solid line.

According to such a configuration, when a current is applied to the electrode 302 by a wire from the external source, the current passes to the SiC carrier 12 via the comb-shaped electrode portions 302a, the fixing layers 304 and the underlying layer 22. Specifically, the current passes through the fixing layers 304 from the comb-shaped electrode portions 302a via the bonding surfaces S1 between the comb-shaped electrode portions 302a and the fixing layers 304, thereafter passes to the underlying layer 22 from the fixing layers 304, which is located on the outer sides of the comb-shaped electrode portions 302a, via the bonding surface S2 between the fixing layers 304 and the underlying layer 22, and then passes to the SiC carrier 12 from the underlying layer 22 via the bonding surface S3 between the underlying layer 22 and the SiC carrier 12 as well as to the SiC carrier 12 from the fixing layers 304 in the through holes 306 of the comb-shaped electrode portions 302a and the through holes 308 of the underlying layer 22 via the bonding surfaces S4 between the fixing layers 304 and the SiC carrier 12.

When such energization is performed, the SiC carrier 12 is heated. The SiC carrier 12 is capable of cleaning the exhaust gas by being activated when it is heated. In this way, according to the electrically-heated catalyst 300, by energizing the SiC carrier 12 to heat it, it is possible to effectively clean the exhaust gas. Further, the electrically-heated catalyst 300 according to the embodiment can obtain effects similar to those obtained by the electrically-heated catalyst 10 according to the first embodiment as described above.

Further, when the energization from the electrode 302 to the SiC carrier 12 is performed, a current path is formed in which a current passing through the fixing layers 304 from the comb-shaped electrode portions 302a directly passes to the SiC carrier 12 without passing through the underlying layer 22 after it passes through the through holes 306, 308. In other words, according to the configuration of the electrically-heated catalyst 300 of the embodiment, a current path from the comb-shaped electrode portions 302a to the SiC carrier 12 can be formed in which the number of the bonding surfaces between the different materials is reduced. Therefore, according to the electrically-heated catalyst 300 of the embodiment, it is possible to reduce current loss at the bonding surfaces in supplying the current from the comb-shaped electrode portions 302a to the SiC carrier 12 and thus to effectively perform the energization from the comb-shaped electrode portions 302a to the SiC carrier 12.

It is noted that in the fourth embodiment as described above the fixing layers 304 are bonded to the comb-shaped electrode portion 302a and surface portions of the underlying layer 22, which surface portions are located on the opposite sides of the comb-shaped electrode portion 302a in a direction perpendicular to the longitudinal direction of the comb-shaped electrode portions 302a, as is the case with the first embodiment as described above, and the fixing layers 304 have the apexes thereof through which the through holes 306, 308 pass; however, the present invention is not limited to this configuration. For example, the fixing layers 304 may be bonded to the comb-shaped electrode portions 302a and only one of the surface portions of the underlying layer 22, which surface portions are located on the opposite sides of the corresponding comb-shaped electrode portion 302a in a direction perpendicular to the longitudinal direction of the comb-shaped electrode portions 302a, and the fixing layers 304 may have the apexes thereof which are slightly shifted from axes through which the through holes 306, 308 pass.

In the first, second, third and fourth embodiments as described above a ceramic carrier which carries a ceramic catalyst is the SiC carrier 12 formed of silicon carbide; however, the present invention is not limited to this configuration. Other ceramic materials can be used.

Further, in the first, second, third and fourth embodiments as described above the fixing layers 24, 102, 202 and 304 are formed in a hemispherical shape; however, the present invention is not limited to this configuration. For example, they may be formed in a rectangular shape.

The invention claimed is:

1. An electrically-heated catalyst comprising:
a carrier;
an electrically conductive underlying layer bonded to the external wall of the carrier;
an electrode portion fixed to an outside surface of the electrically conductive underlying layer; and
an electrically conductive fixing layer fixed to a part of the outside of the electrode portion;
wherein the electrically conductive underlying layer has a coefficient of thermal expansion between a coefficient of thermal expansion of the carrier and a coefficient of thermal expansion of the electrode portion,
wherein the electrically conductive fixing layer has a coefficient of thermal expansion between the coefficient of thermal expansion of the electrode portion and the coefficient of thermal expansion of the electrically conductive underlying layer, and
wherein the electrode portion is fixed to the carrier by bonding the electrically conductive fixing layer to the electrically conductive underlying layer and to the electrode portion.

2. The electrically-heated catalyst of claim 1, wherein more than two electrically conductive fixing layers bond to the electrically conductive underlying layer and to the electrode portion to fix the electrode portion to the carrier at more than two points spaced apart.

3. The electrically-heated catalyst of claim 2, wherein the electrode portion has more than two comb-shaped electrodes.

4. The electrically-heated catalyst of claim 3, wherein at least one of the electrically conductive fixing layers bonds to a portion of a corresponding comb-shaped electrode of the more than two comb-shaped electrodes and at least one surface of surface portions of the electrically conductive underlying layer, the surface portions being located on the opposite sides of the corresponding comb-shaped electrode portion in a direction perpendicular to the longitudinal direction of the corresponding comb-shaped electrode portion.

5. The electrically-heated catalyst of claim 3, wherein at least one of the electrically conductive fixing layers straddles portions of at least two comb-shaped electrode of the more than two comb-shaped electrodes portions which are neighboring in a direction perpendicular to the longitudinal direction of the comb-shaped electrode portions.

6. The electrically-heated catalyst of claim 3, wherein a portion of at least one of the more than two comb-shaped electrodes includes through hole passing therethrough toward the underlying layer, the underlying layer includes a through hole passing therethrough toward the carrier, the through hole of the electrically conductive underlying layer being in communication with the through hole of the comb-shaped electrode portion, and at least one of the electrically conductive fixing layers bonds directly to the carrier via the through hole of the comb-shaped electrode portion and the through hole of the electrically conductive underlying layer.

7. The electrically-heated catalyst of claim 3, wherein the carrier is a ceramic carrier made of ceramic, and the more than two comb-shaped electrodes are metal electrodes.

8. The electrically-heated catalyst of claim 1, wherein the electrically conductive fixing layer is formed by thermal spraying.

* * * * *